US000001472H

United States Statutory Invention Registration [19]

[11] Reg. Number: H1472

Tran

[43] Published: Aug. 1, 1995

[54] COMPUTER INTERFACE ADAPTER FOR SUPPORTING DATA COMMUNICATION BETWEEN A PARALLEL SIGNAL DEVICE AND A SERIAL SIGNAL DEVICE

[75] Inventor: Matthew T. Tran, San Diego, Calif.

[73] Assignee: The United States of America as represented by the Secretary of the Navy, Washington, D.C.

[21] Appl. No.: 944,155

[22] Filed: Sep. 11, 1992

[51] Int. Cl.[6] ..... G06F 3/00

[52] U.S. Cl. ..... 395/500

[58] Field of Search ..... 395/500

[56] References Cited

U.S. PATENT DOCUMENTS

| | | | |
|---|---|---|---|
| 3,975,712 | 8/1976 | Hepworth et al. | 371/49.1 |
| 4,431,864 | 2/1984 | Sturdevant, Jr. | 178/3 |
| 4,728,930 | 3/1988 | Grote et al. | 341/101 |
| 4,740,909 | 4/1988 | Conklin et al. | 395/325 |
| 5,257,289 | 10/1993 | Jopson | 375/36 |

*Primary Examiner*—Bernarr E. Gregory
*Attorney, Agent, or Firm*—Harvey Fendelman; Thoms Glenn Keough

[57] ABSTRACT

A computer interface adapter is provided to support data communication between a parallel signal device operating at the MIL-STD-1397B Type B interface and a serial signal device operating at the MIL-STD-1397B Type E interface. A first converter, connected to the input and output channels of the parallel signal device, converts parallel format data between the Type B voltage level and a standard transistor-transistor-logic (TTL) level. A second converter, connected to the input and output ports of the serial signal device, converts serial format data between the Type E voltage level and the standard TTL level. Staging memory is provided to temporarily store parallel format data at the standard TTL level. A parallel-to-serial converter converts parallel format data in the staging memory into serial format data at the standard TTL level and passes same to the second converter. A serial-to-parallel converter converts serial format data passed from the second converter into parallel format data at the standard TTL level and passes same to the staging memory. Combinational logic circuitry, in communication with the first converter, the parallel-to-serial converter and the serial-to-parallel converter, processes handshake protocol at the standard TTL level between the parallel signal device and the serial signal device. In addition, the logic circuitry latches parallel format data through the staging memory in accordance with the handshake protocol.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPUTER INTERFACE ADAPTER FOR SUPPORTING DATA COMMUNICATION BETWEEN A PARALLEL SIGNAL DEVICE AND A SERIAL SIGNAL DEVICE

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of computer interfaces, and more particularly to an interface adapter that supports data communication between a parallel signal device operating at a first digital voltage level and a serial signal device operating at a second digital voltage level. One such data communication situation exists in the Navy where a Military Standard MIL-STD-1397B Type B parallel signal device must interface with a MIL-STD-1397B Type E serial signal device.

BACKGROUND OF THE INVENTION

It is well known in the computer art that many large systems are built from modular components. Typically, each of the system components has been designed in an optimum fashion for its particular purpose. For example, while some systems process data in a parallel format, others process data in a serial format. In addition, even though the various system components are "digital" in nature for most systems, the various voltage signal levels recognized as digital "on" or "off" may vary. A digital "high" (or "on") for one system component may be recognized as a "low" (or "off") for another system component.

One example of this situation is encountered in the Navy where a computer disk storage (Magnetic Disk AN/UTH-3(V)) unit must interface with a host computer (e.g., an IBM PC/AT compatible computer) processing data in a parallel format. The disk unit inputs and outputs data in a serial format in accordance with the MIL-STD-1397B Type E format (−0.8 volts="low", +0.8 volts="high") and the computer inputs and outputs data in a parallel format in accordance with the MIL-STD-1397B Type B format (−3.0 volts="low", −0.5 volts="high"). Currently, no interface exists that would permit data communication between two devices operating individually on the Type B and Type E formats.

Thus, the need exists for an interface that supports data communication between a MIL-STD-1397B Type B parallel signal device and a MIL-STD-1397B Type E serial signal device.

Accordingly, it is an object of the present invention to provide an interface adapter that supports data communication between a parallel signal device operating at a first digital voltage level and a serial signal device operating at a second digital voltage level.

Another object of the present invention is to provide an interface adapter that supports data communication between a MIL-STD-1397B Type B parallel signal device and a MIL-STD-1397B Type E serial signal device.

SUMMARY OF THE INVENTION

In accordance with the present invention, a computer interface adapter for supporting data communication between a parallel signal device and a serial signal device is provided. The parallel signal device has separate input and output channels operating at a first digital voltage level. The serial signal device has separate input and output ports operating at a second digital voltage level. A first converter, connected to the input and output channels of the parallel signal device, converts parallel format data between the first digital voltage level and a standard transistor-transistor-logic (TTL) level. Parallel format data passes from and to the input and output channels, respectively. A second converter, connected to the input and output ports of the serial signal device, converts serial format data between the second digital voltage level and the standard TTL level. Serial format data passes from and to the input and output ports, respectively. Staging memory is provided to temporarily store parallel format data at the standard TTL level. A parallel-to-serial converter converts parallel format data from the output channel maintained in the staging memory into serial format data at the standard TTL level. The parallel-to-serial converter also passes converted serial format data at the standard TTL level to the second converter. A serial-to-parallel converter converts serial format data passed from the output port through the second converter into parallel format data at the standard TTL level. The serial-to-parallel converter also passes converted parallel format data at the standard TTL level to the staging memory. Combinational logic circuitry, in communication with the first converter, the parallel-to-serial converter and the serial-to-parallel converter, processes handshake protocol at the standard TTL level between the parallel signal device and the serial signal device. In addition, the logic circuitry latches parallel format data through the staging memory in accordance with the handshake protocol.

DESCRIPTION OF THE PREFERRED EMBODIMENT

Figure 1:
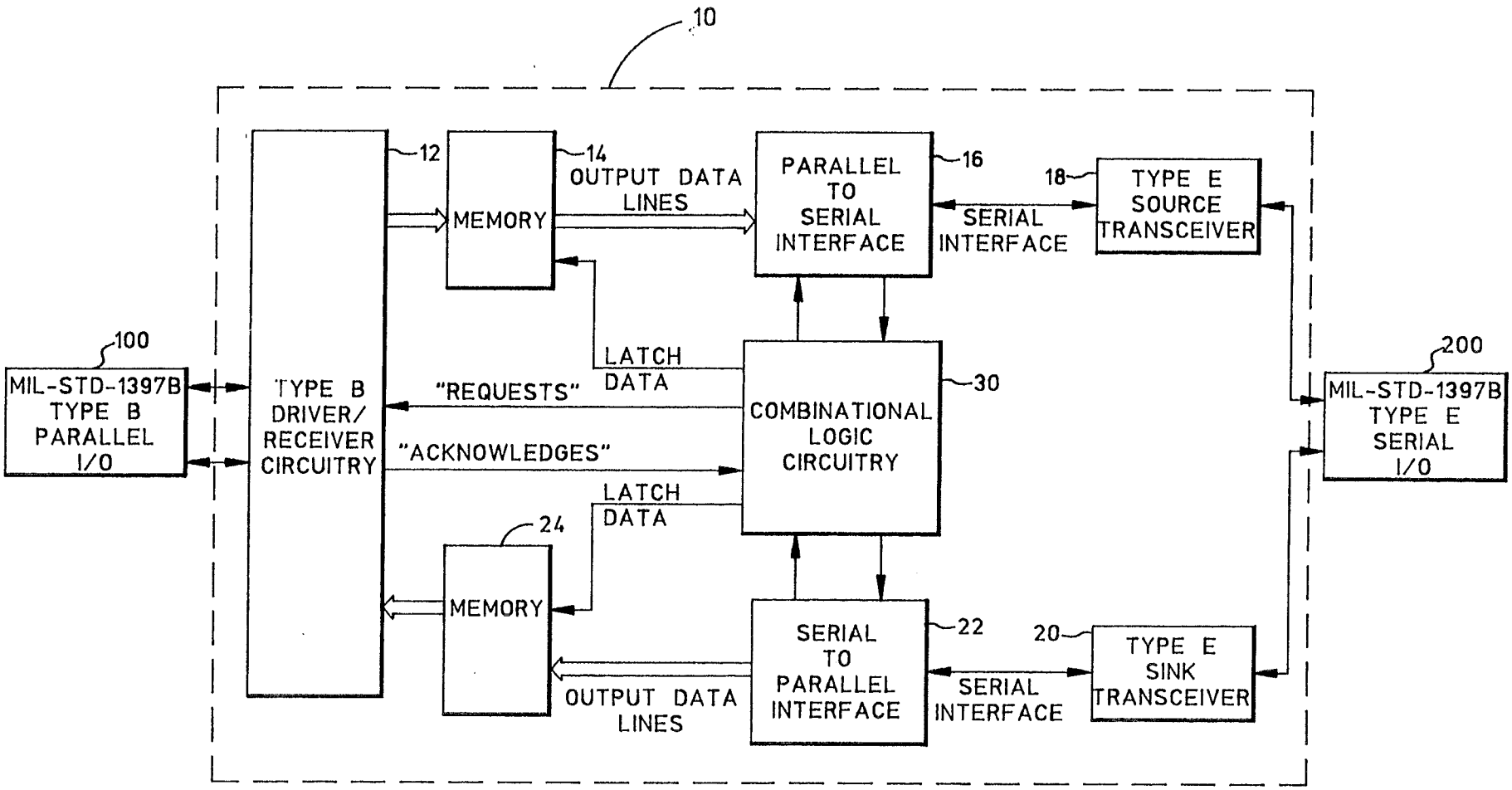
FIG. 1 is a functional block diagram of the data system interface adapter according to the present invention.

Referring now to the drawings, and in particular to FIG. 1, a functional block diagram is shown of data system interface adapter 10 according to the present invention. In the preferred embodiment, adapter 10 is connected between parallel signal device 100 whose input/output (I/O) voltage levels are in accordance with Military Standard MIL-STD-1397B Type B and serial signal device 200 whose I/O voltage levels are in accordance with MIL-STD-1397B Type E. However, it is within the scope of the present invention that it be used as an interface between other parallel I/O signal devices and serial I/O signal devices whose I/O voltage levels are different from one another.

The Type B and E (as they will be referred to hereinafter for sake of simplicity) interface specifications are known in the art. However, for completeness of disclosure, they will be discussed briefly below:

Type B Parallel Interface

The Type B parallel interface accommodates data transfers of 16-bit or 32-bit words. All bits are transferred in parallel over two 50-pin connector cables, one cable for the input channel and one for the output channel. Included on each connector are various dedicated "request" and "acknowledge" protocol bits whose function will be explained further below. The digital voltage level associated with a digital "one" is −0.5 volts DC, and the digital voltage level associated with a digital "zero" is −3.0 volts DC.

Type E Serial Interface

The Type E serial interface accommodates data transfers over a greater distance than is possible with a Type E interface (i.e., Type E can communicate over distances up to 985 feet while Type B can only communicate over distances up to 50 feet.) All bits are transferred over two bidirectional triaxial cables, one cable for receiver input and one for transmitting output. Control frames are transmitted in a bi-directional fashion over each of the cables. The digital voltage level associated with a digital "one" is 0.8 volts DC, and the digital voltage level associated with a digital "zero" is −0.8 volts DC.

Since both the Type B and E interface specifications utilize non-standard digital signal levels, provision has been made in adapter 10 to convert all Type B bits passing to and from parallel signal device 100 and all Type E bits passing to and from serial signal device 200 into a standard digital level. For sake of design simplicity, the standard transistor-transistor-logic (TTL) was chosen, i.e., a digital "one" is 2.4 volts DC or greater and a digital "zero" is 0 volts DC. Accordingly, driver/receiver circuitry 12 is provided to convert between the Type B voltage level and standard TTL.

In terms of data being passed to serial signal device 200, memory 14 temporarily stores or stages the parallel format data passed from driver/receiver circuitry 12 at the standard TTL level. Since Type B accommodates 16-bit or 32-bit words, memory 14 is preferably a 32-bit register. Parallel-to-serial interface 16 converts the parallel format data into a serial data stream at the standard TTL level and passes to source transceiver 18. Source transceiver 18 converts the serial data stream from the standard TTL level to the Type E signal level for processing by serial signal device 200. As will be explained further below, control frames governing the transfer of data to serial signal device 200 are passed bi-directionally between device 200 and parallel-to-serial interface 16.

In a similar fashion, control frames governing the transfer of data from serial signal device 200 are passed bi-directionally between device 200 and a serial-to-parallel interface 22. The process of transferring data to parallel signal device 100 is essentially the reverse of that described above. Specifically, sink transceiver 20 converts a Type E serial data stream to a standard TTL level serial data stream. Serial-to-parallel interface 22 converts the serial data stream into parallel format data that is temporarily stored or staged in memory 24 (e.g, a 32-bit register for the preferred embodiment). The parallel format data in memory 24 is passed through driver/receiver circuitry 12 where it is converted into parallel data having the Type B signal level for processing by parallel signal device 100.

Figure 2:
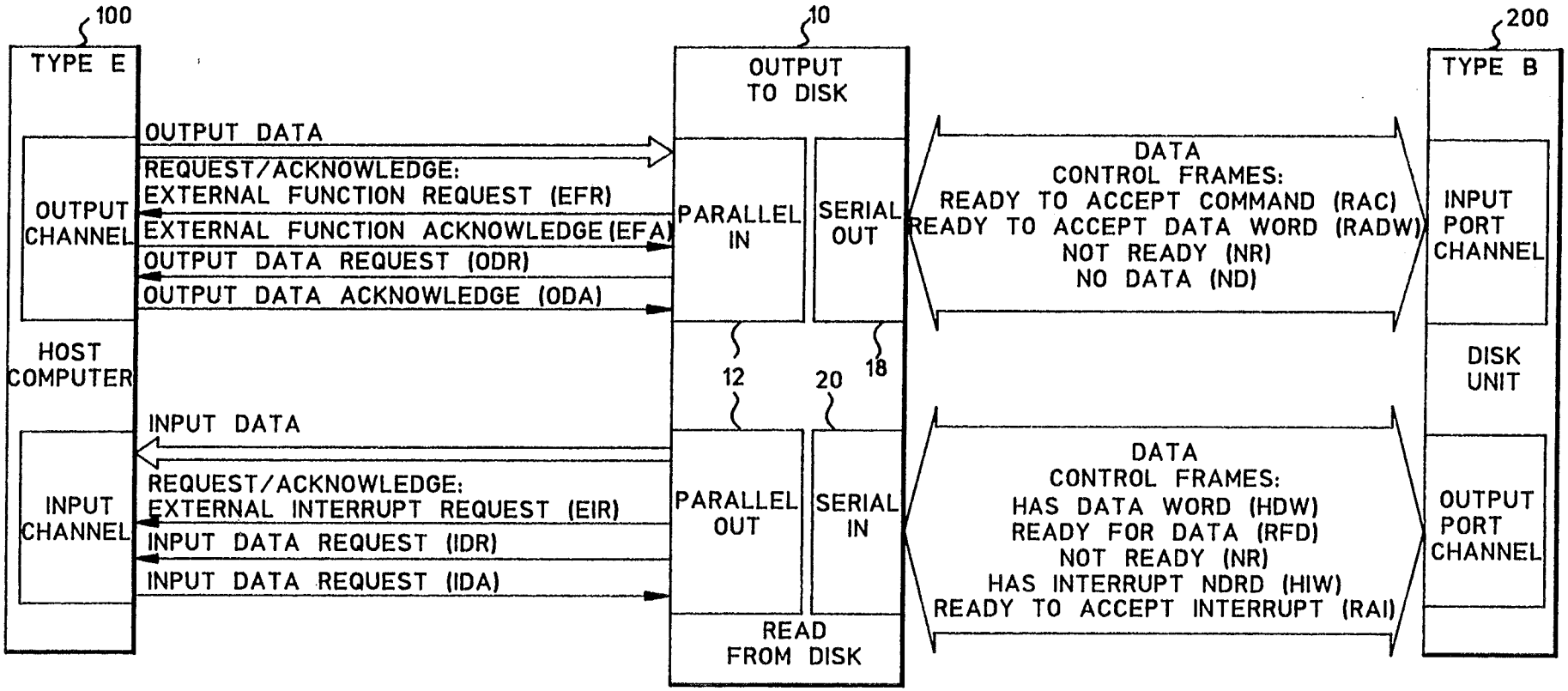
FIG. 2 is a diagram of the handshake protocol, transferred via the preferred embodiment interface adapter, between a Military Standard MIL-STD-1397B Type B parallel signal device and a MIL-STD-1397B Type E serial signal device.

Controlling the transfer of data through adapter 10 in either direction is combinational logic circuitry 30. With continued reference to FIG. 1, operation of logic circuitry 30 will now be explained in terms of controlling the transfer of data between devices 100 and 200. In addition, FIG. 2 shows the handshake protocol exchanged between Type B and Type E devices. Common reference numerals are used for those elements common to FIG. 1. For purposes of description, it will be assumed that parallel signal device 100 is a host computer and that serial signal device 200 is a disk unit. Thus, data transfers between computer 100 and disk 200 consist of a "write" to disk 200 and a "read" from disk 200. By way of convention, output from computer 100 is input to disk 200, and output from disk 200 is input to computer 100.

Write Operation

1. At power up, adapter 10 is in the idle wait state during which time logic circuitry 30 exchanges control frames with disk 200 via interfaces 16 and 22. Even when no data is being transferred, status control frames are exchanged with respect to the disk's intent to send or ability to receive data. When it is ready to accept data, disk 200 generates a "ready to accept command" (RAC).

2. Logic circuitry 30 senses the RAC and, assuming no data resides in either memory 14 or 24, an "external function request" (EFR) is issued to computer 100.

3. Computer 100 senses the EFR, places command data (e.g., a "write" instruction) on its output channel lines and issues an "external function acknowledge" (EFA).

4. Logic circuitry 30 recognizes the EFA, discontinues the EFR and latches the command data into memory 14. Note that control frames between logic circuitry 30 and disk 200 are still being exchanged during this time. Upon receipt of the next RAC from disk 200, the command data is latched through memory 14 and sent disk 200 via parallel-to-serial interface 16 and source transceiver 18.

5. Disk 200 decodes the command data to begin the write operation. Specifically, disk 200 issues a "ready to accept data word" (RADW) to logic circuitry 30.

6. Upon receipt of a RADW, logic circuitry 30 checks memory 14 and the "output data acknowledge" (ODA) and "output data request" (ODR) lines. Assuming memory 14 or the ODA/ODR lines are inactive, logic circuitry 30 issues an ODR to computer 100 and a "no data" (ND) to disk 200. However, if there is data in memory 14, the data will be latched through memory 14 and sent to disk 200.

7. Computer 100 senses the ODR, places parallel format data on its output channel lines and issues an ODA.

8. Logic circuitry 30 senses the ODA, drops the ODR and latches the parallel format data into memory 14. Data is maintained in memory 14 until the next RADW is received from disk 200 at which time the data is latched through memory 14 and passed on to disk 200 (via parallel-to-serial interface 16 and source transceiver 18).

9. If disk 200 is ready for more data, another RADW is issued and steps 6 through 8 are repeated until all data is transferred by computer 100.

10. Once the data transfer is complete, disk 200 issues a "has interrupt word" (HIW) to logic circuitry 30. In response, logic circuitry 30 checks the "external interrupt request" (EIR) line for activity. If EIR is inactive, logic circuitry 30 issues a "ready to accept interrupt" (RAI) to disk 200. If EIR is active, a "not ready" (NR) is issued to disk 200.

11. In response to the RAI, disk 200 transmits an interrupt word through sink transceiver 20 and serial-to-parallel interface 22. Logic circuitry 30 latches the interrupt word into and through memory 24 where it is placed on the input channel lines for computer 100. In addition, logic circuitry 30 issues an EIR to computer 100.

12. Upon receipt of the interrupt word, computer 100 issues an "input data acknowledge" (IDA).

13. In response to the IDA, logic circuitry 30 discontinues the EIR and issues ND to disk 200 until new command data is received from computer 100.

Read Operation

1. Steps 1–4 of the Write Operation are repeated except that the command data is now a "read" instruction.

2. Disk 200 decodes the command data to begin the read operation. Specifically, disk 200 assembles the data to send (one word at a time) and issues a "has data word" (HDW) to logic circuitry 30.

3. Upon receipt of a HDW, logic circuitry 30 checks both the EIR and the "input data request" (IDR) lines for activity. Assuming inactivity of these lines, logic circuitry 30 issues a "ready for data" (RFD) to disk 200. If either of these lines is active, logic circuitry 30 issues a NR to disk 200.

4. In response to the RFD, disk 200 transmits a data word (through transceiver 20 and interface 22) so that it may be latched as a (parallel format) data word in memory 24. Logic circuitry 30 then places the data word on the input channel lines to computer 100 and issues a NR to disk 200 until such time that in IDA is received from computer 100 indicating that the data word was accepted at the computer's input channel.

5. In response to the IDA, logic circuitry 30 discontinues the IDR and enters its idle wait state. Steps 3 and 4 are repeated until all data associated with the read command has been transferred.

6. Once the data transfer is complete, disk 200 issues a HIW to logic circuitry of the EIR line. If EIR is inactive, logic circuitry 30 issues a RAI to disk 200. If EIR is active, a NR is issued to disk 200.

7. In response to the RAI, disk 200 transmits the interrupt word through transceiver 20 and interface 22. Logic circuitry 30 latches the interrupt word into and through memory 24 where it is placed on the computer's input channel lines. In addition, logic circuitry 30 issues an EIR to computer 100.

8. Upon receipt of the interrupt word, computer 100 issues an IDA to logic circuitry 30.

9. In response to the IDA, logic circuitry 30 discontinues the EIR, and enters its idle wait state.

The advantages of the present invention are numerous. The interface adapter allows each of Type B parallel and Type E serial devices to communicate with one another without altering either device's I/O data processing or protocol. Since the internal operation of the interface adapter is based on standard TTL levels, the adapter can be constructed with off-the-shelf components.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A computer interface adapter for transferring data between a parallel signal device operating at a first digital voltage level and a serial signal device operating at a second digital voltage level, comprising:

first means for converting data between said first digital logic level and a third digital logic level;

second means for converting data between said second digital voltage level and said third digital logic level;

third means for storing data at said third digital logic level in a parallel format;

fourth means for converting between said data stored in parallel format and serial data at said third digital logic level; and combinational logic means for controlling data transfers between said first means, said second means, said third means and said fourth means.

2. A computer interface adapter as in claim 1 wherein said parallel signal device operates at the Military Standard MIL-STD-1397B Type B digital voltage level, and wherein said serial signal device operates at the MIL-STD-1397B Type E digital voltage level, said third means comprising 32-bit register means.

3. A computer interface adapter as in claim 1 wherein said third digital logic level is a standard transistor-transistor-logic (TTL) level.

* * * * *